US011992716B2

(12) United States Patent
Sukay

(10) Patent No.: US 11,992,716 B2
(45) Date of Patent: May 28, 2024

(54) CONSOLIDATED AERIAL HIGH CAPACITY FOAM FIREFIGHTING SYSTEM

(71) Applicant: Larry Sukay, San Diego, CA (US)

(72) Inventor: Larry Sukay, San Diego, CA (US)

(73) Assignee: Western States Fire, Inc.

( * ) Notice: Subject to any disclaimer, the term of this patent is extended or adjusted under 35 U.S.C. 154(b) by 296 days.

(21) Appl. No.: 17/156,369

(22) Filed: Jan. 22, 2021

(65) Prior Publication Data

US 2021/0228924 A1 Jul. 29, 2021

Related U.S. Application Data

(60) Provisional application No. 63/052,239, filed on Jul. 15, 2020, provisional application No. 62/965,704, filed on Jan. 24, 2020.

(51) Int. Cl.
*A62C 3/02* (2006.01)
*A62C 5/02* (2006.01)

(52) U.S. Cl.
CPC ............ *A62C 3/0242* (2013.01); *A62C 5/022* (2013.01)

(58) Field of Classification Search
CPC ......... A62C 3/0242; A62C 5/02; A62C 5/022; A62C 5/024; A62C 3/0207
USPC .............................................. 169/14, 15, 53
See application file for complete search history.

(56) References Cited

U.S. PATENT DOCUMENTS 2,609,240 A * 9/1952 Faulkner .............. A62C 3/0207 239/455
3,186,490 A * 6/1965 Jamison ................. A62C 5/002 261/DIG. 26
3,500,935 A * 3/1970 Wiedorn .............. A62C 3/0207 261/DIG. 26
3,572,441 A 3/1971 Nodegi
3,750,754 A * 8/1973 Stults ..................... A62C 5/022 169/9

(Continued)

FOREIGN PATENT DOCUMENTS

FR 2761950 A1 10/1998
GB 1394140 A 5/1975

OTHER PUBLICATIONS

Leader, "Ventilation Accessories", <https://www.leader-group.company/sites/default/files/ic_import/product/ files/DS_ACCESSORIES_FANS_ZCL03.265.EN.9.pdf>, Feb. 2019 (Year: 2019).*

(Continued)

*Primary Examiner* — Cody J Lieuwen
(74) *Attorney, Agent, or Firm* — Gary L. Eastman, Esq.; Eastman IP

(57) ABSTRACT

An aerial firefighting system has a foam production unit attached to an aircraft. The foam production unit has a single unit variable block high expansion foam generator; a light weight bladder tank system for collection and storage of water; a light weight bladder tank system for storage of a foaming agent; a telemetry unit for adjusting air flow, foam agent proportioning, and water pressure; and tubing for foam stream straightening. The foam production unit also has a fan capable of delivering at least 75,000 cubic feet per minute of air. The incorporation of a high-CFM fan increases foam production capability more than tenfold over existing aerial firefighting systems. The volume of firefighting foam produced is in excess of 50,000 cubic feet of foam per minute.

9 Claims, 11 Drawing Sheets

(56) References Cited

U.S. PATENT DOCUMENTS

| | | | | | |
|---|---|---|---|---|---|
| 4,979,571 | A | | 12/1990 | Macdonald | |
| 5,385,208 | A | * | 1/1995 | Baker | A62C 5/02<br>169/53 |
| 5,699,862 | A | * | 12/1997 | Rey | B64D 1/16<br>169/53 |
| 6,688,402 | B1 | * | 2/2004 | Wise | B64D 1/22<br>169/44 |
| 9,555,886 | B1 | | 1/2017 | Hawass | |
| 2013/0199806 | A1 | * | 8/2013 | Zimmerman | A62C 31/12<br>169/53 |
| 2014/0069666 | A1 | | 3/2014 | Vetesnik | |
| 2017/0072234 | A1 | | 3/2017 | Lluis | |
| 2018/0243595 | A1 | | 8/2018 | Zimmerman | |

OTHER PUBLICATIONS

Leader, "Petrol-Driven Fan MT296", <https://www.leader-group.company/sites/default/files/ic_import/product/files/ DS_MT296_fan_ZCL03.265.EN.9.pdf>, Feb. 2019 (Year: 2019).*

* cited by examiner

CONSOLIDATED AERIAL HIGH CAPACITY FOAM FIREFIGHTING SYSTEM

RELATED APPLICATIONS

This application claims the benefit of priority to U.S. Provisional Patent Application Ser. No. 63/052,239 for a "Consolidated Aerial High Capacity Foam Firefighting System," filed Jul. 15, 2020, and to U.S. Provisional Patent Application Ser. No. 62/965,704 for a "Consolidated Aerial High Capacity Foam Firefighting System," filed Jan. 24, 2020.

FIELD OF THE INVENTION

The present invention pertains generally to apparatus for use in fire suppression. More particularly, the present invention pertains to aerial foam generation and delivery system. The present invention is particularly, but not exclusively, useful as a consolidated aerial high capacity foam firefighting system.

BACKGROUND OF THE INVENTION

A perennial problem in aerial firefighting systems is the capacity of the system for carrying fire suppressant or its components. The system's carrying capacity for water is particularly limiting, since water is usually used as the fire suppressant or an ingredient in the fire suppressant. As a result of limited carrying capacity, aerial firefighting systems are only able to combat a fire for a short time before they must be removed to ground to be refilled with additional fire suppressant or fire suppressant components. The resulting downtime is often a great constraint on the system's effectiveness, especially when responding to fires extending over large areas.

In aerial firefighting systems that produce firefighting foam as a fire suppressant, an additional constraint on effectiveness is the rate of production of firefighting foam. More generally, an aerial firefighting system cannot deliver fire suppressant faster than it can produce it.

Therefore, it would be advantageous to provide an aerial firefighting system capable of providing a larger amount of fire suppressant at a higher rate of delivery than current systems are capable of delivering. It would be further advantageous to provide an aerial firefighting system capable of multiple suppression sequences without ground time.

SUMMARY OF THE INVENTION

Disclosed is an aerial firefighting system with a foam production unit attached to an aircraft. A preferred embodiment of the foam production unit has a variable block high expansion foam generator; a light weight bladder tank system for collection and storage of water; a light weight bladder tank system for storage of a foaming agent; a telemetry unit for adjusting air flow, foam agent proportioning, and water pressure; and tubing for foam stream straightening.

In a preferred embodiment, the foam production unit has a fan capable of delivering at least 75,000 cubic feet per minute (CFM) of air. The incorporation of a high-CFM fan—that is, a 75,000-or-greater-CFM fan—increases foam production capability more than tenfold over existing aerial firefighting systems. More particularly, with the incorporation of a high-CFM fan, the foam production unit is capable of producing foam at a volume ratio compared to the water used of 1,000:1; preferred embodiments can produce foam at a ratio as high as 1,200:1. The fan also significantly increases the volume of foam that can be produced, allowing the foam production unit to produce in excess of 50,000 cubic feet of foam per minute on a consistent basis.

In a preferred embodiment, the foam and water tanks are constructed of a light weight bladder tank system supported by carbon fiber, aluminum, or both, and a steel screen system in order to reduce the weight load imparted by the tanks.

Also present in preferred embodiments of the aerial firefighting system is a stream straightening system made with flexible tubing suspended below the foam production unit. A preferred embodiment of the stream straightening system includes a flexible synthetic nylon tube that is lowered and raised by power winches located at the base of the foam production unit using elevation cables connected to a weighted ring at the bottom of the nylon tube.

A preferred embodiment of the aerial firefighting system also has a telemetry unit with a variable block foam proportioning system that allows the pilot to adjust the foam production unit's fan speed, water pressure, and foam proportioning while in flight. This allows the pilot to adjust final foam product production based on fire conditions to achieve the greatest fire suppression impact.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
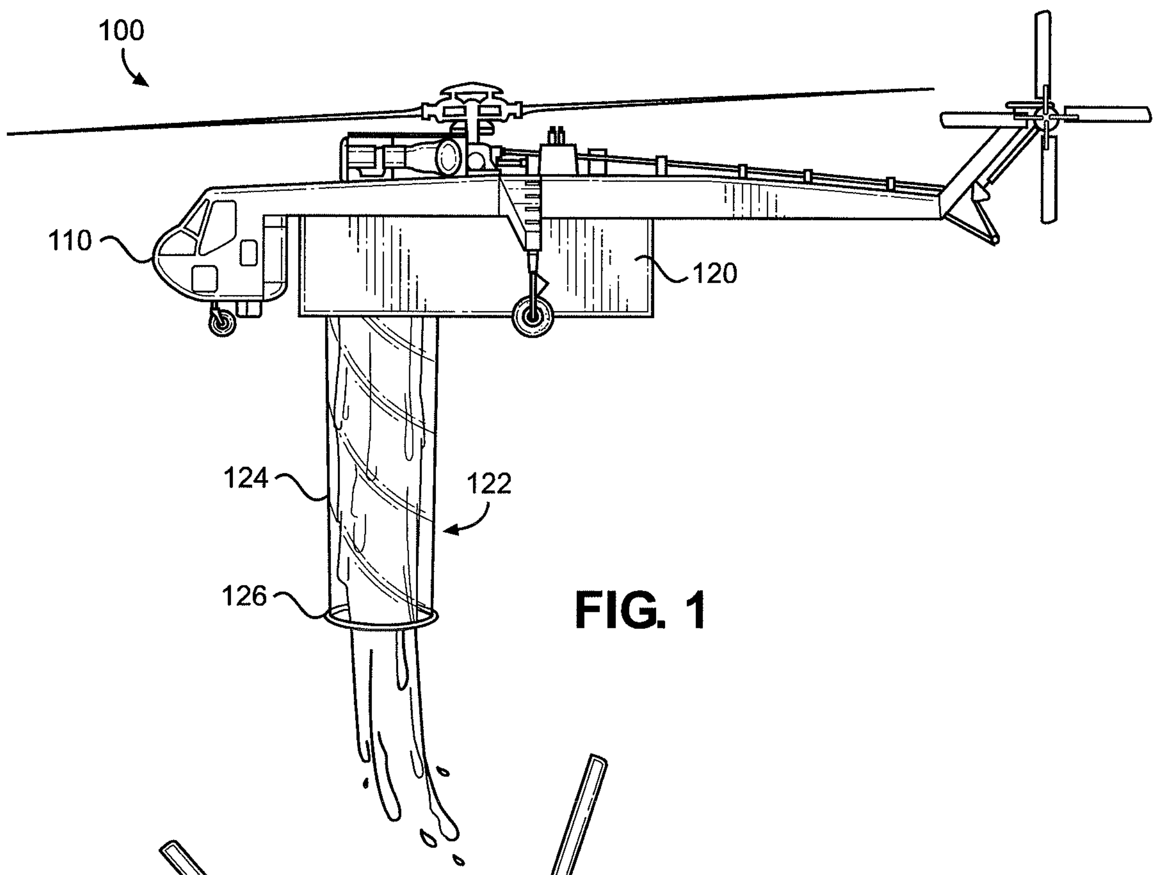
FIG. 1 is a right-side view of a preferred embodiment of a consolidated aerial high capacity foam firefighting system.

Referring initially to FIG. 1, a side view of a preferred embodiment of a consolidated aerial high capacity foam firefighting system (hereinafter referred to as "aerial firefighting system") is illustrated and generally designated 100. Aerial firefighting system 100 includes an aircraft 110 to which a foam production unit 120 is fixed. The aerial firefighting system 100 attaches to the aircraft 110 through eight (8) hardpoints on the fuselage. A foam tubing straightener 122 is suspended below foam production unit 120 such that foam generated by foam production unit 120 is delivered through foam tubing straightener 122. In a preferred embodiment, aircraft 110 is a helicopter.

A preferred embodiment of aerial firefighting system 100 is used for the production and delivery of class A firefighting foams for fighting wildfires and other class A fires as well as high expansion foam such as that sold in conjunction with the mark CHEMGUARD XTRA. However, it will be apparent to one of ordinary skill in the art that various embodiments of aerial firefighting system 100 are also usable with the other types of firefighting foam known in the art.

Figure 2:
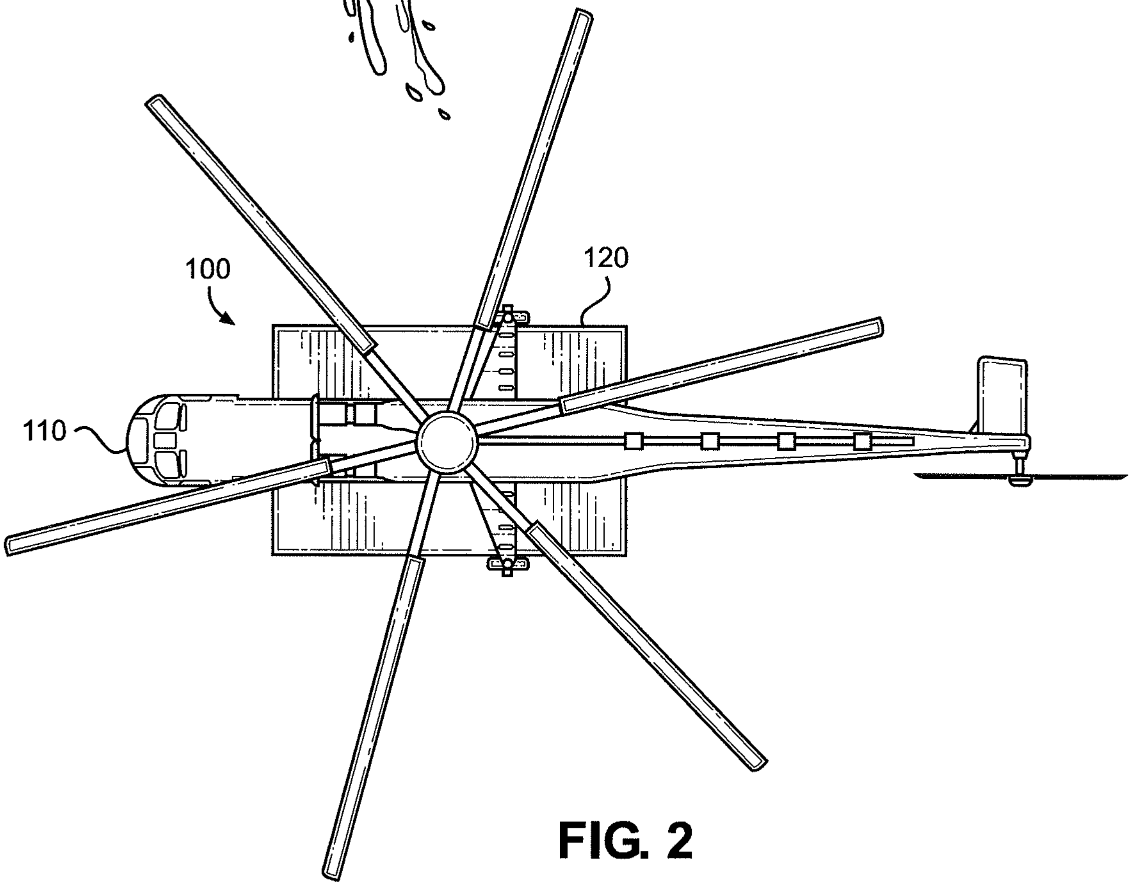
FIG. 2 is a top-down view of the aerial firefighting system.

Referring now to FIG. 2, a top-down view of aerial firefighting system 100 is illustrated. As shown in FIG. 2, foam production unit 120 is fixed underneath the aircraft 110. Each embodiment of foam production unit 120 has dimensions and weight appropriate to the type or types of aircraft 110 with which it is intended to be used.

Figure 3:
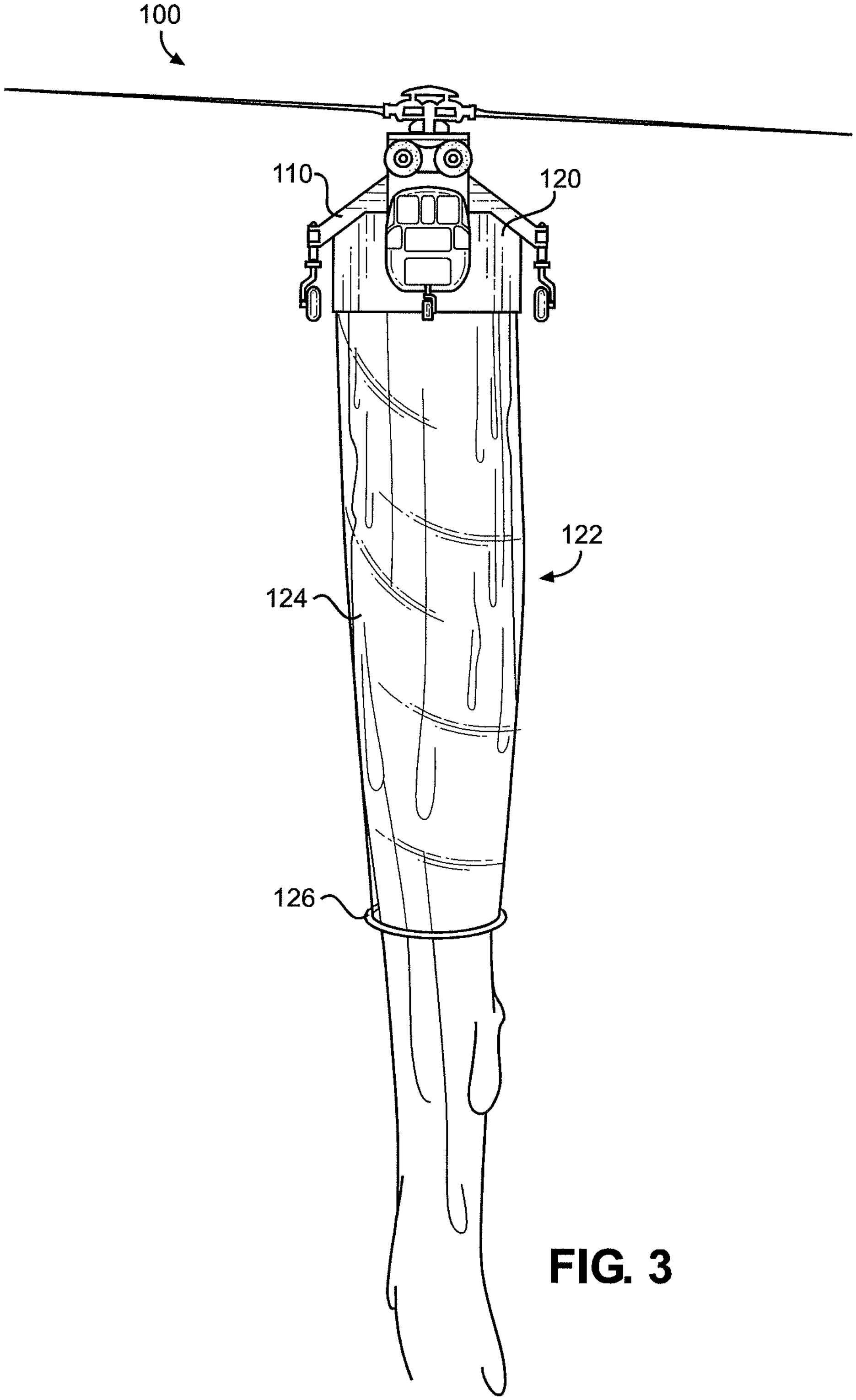
FIG. 3 is a front view of the aerial firefighting system.

Referring now to FIG. 3, a front view of aerial firefighting system 100 is shown, illustrating foam tubing straightener 122 in a fully deployed configuration. In a preferred embodiment, foam tubing straightener 122 includes a flexible synthetic nylon tube 124 suspended under the foam production unit and is lowered and raised by cables connected to a weighted ring 126 at the bottom of the tube 124.

Figure 4:
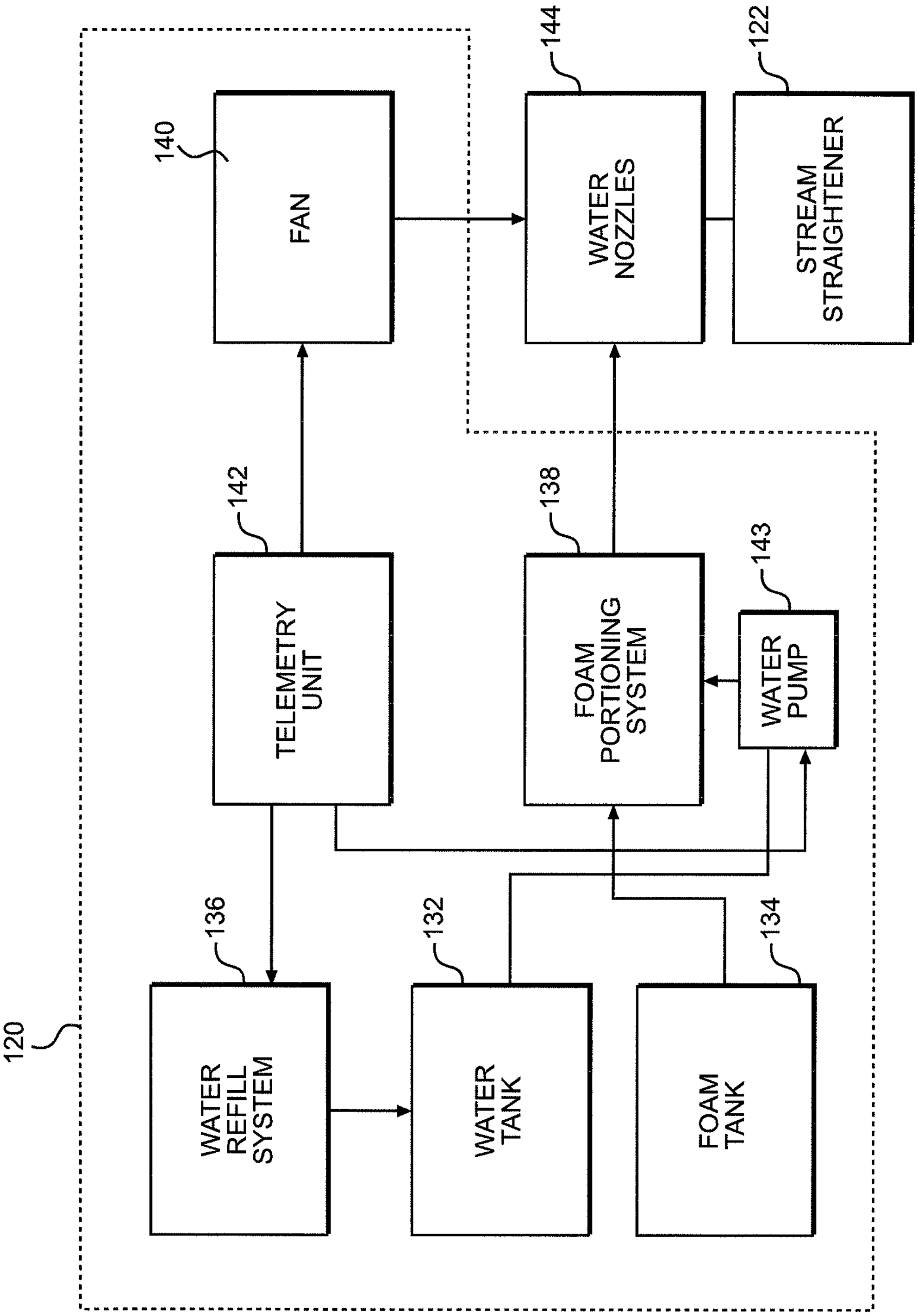
FIG. 4 is a block diagram of components of a preferred embodiment of a foam production unit of the aerial firefighting system.

Referring now to FIG. 4, a block diagram of components of a preferred embodiment of foam production unit 120 is shown. A water tank 132 and a foam tank 134 are constructed of a lightweight bladder tank system supported by carbon fiber, aluminum, or both, and a steel screen system to reduce weight load. A water refill system 136 allows for in-flight filling of the water tank 132 in order to allow aerial firefighting system 100 to avoid landing each time water tank 132 needs to be refilled. A variable block foam proportioning system 138 mixes foam concentrate from foam tank 134 and water from water tank 132. The resultant foam is expanded with the help of a high-CFM fan 140, allowing for the production of more than fifty-thousand cubic feet of foam per minute. The high-CFM fan 140 also allows foam to be produced at a ratio of one-thousand to one (1,000:1), and as high as one-thousand-two-hundred to one (1,200:1), an increase of a factor of ten or more over existing firefighting systems that produce foam at a one-hundred to one (100:1) ratio.

Preferred embodiments of foam production unit 120 include a telemetry unit 142 with foam proportioning system 138. Telemetry unit 142 is configured to allow the pilot of aircraft 110 (not shown in FIG. 4) to adjust the fan 140 speed, water pressure, and foam proportioning while in flight. Water pump 143 provides water to foam proportioning system 138 at the rate directed by telemetry unit 142. As a result, the pilot is able to adjust the final foam product production based on fire conditions in order to achieve the greatest fire suppression impact.

Preferred embodiments of foam production unit 120 are removable from aircraft 110 to operate as a standalone mobile ground foam production unit.

Figure 5:
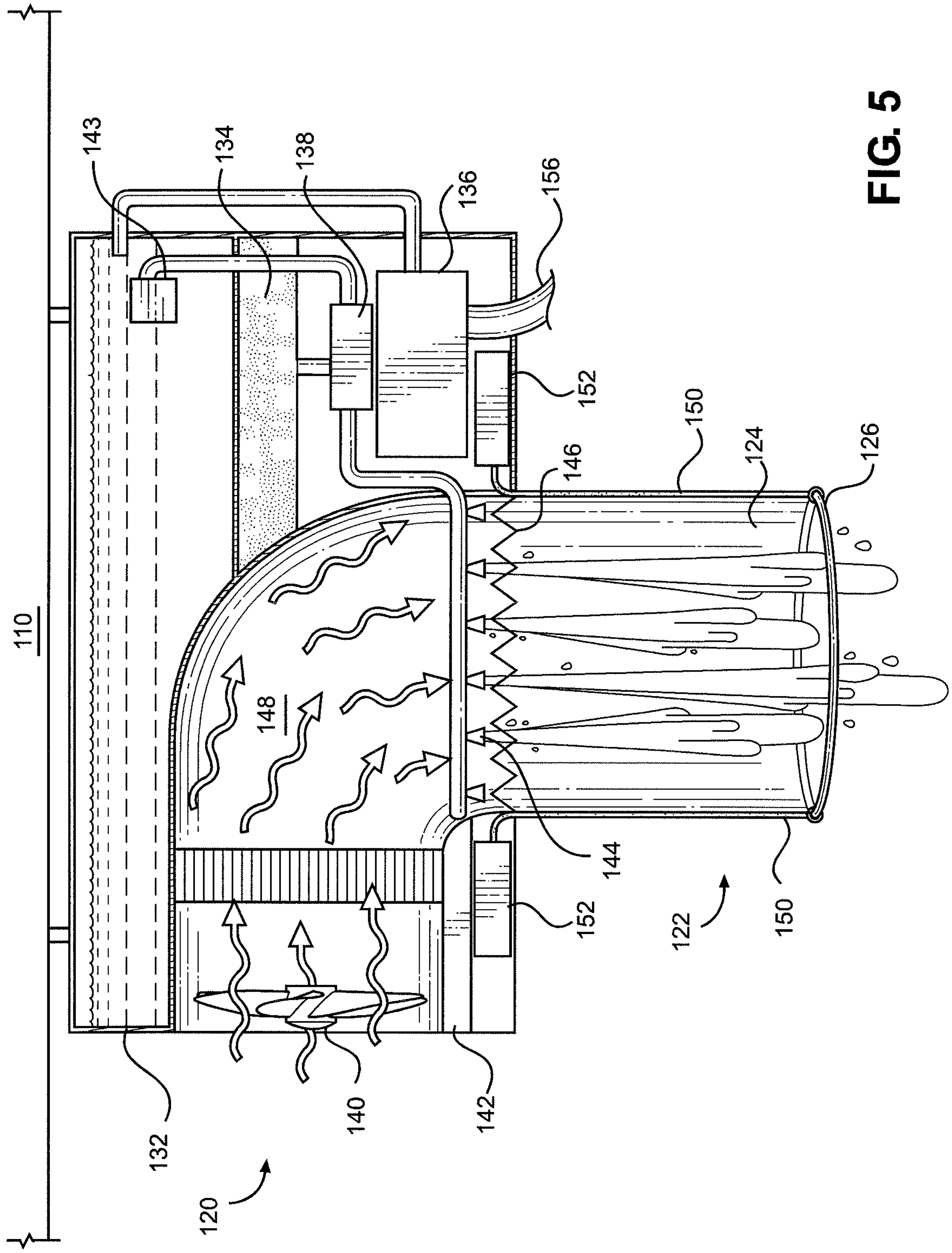
FIG. 5 is an explanatory diagram illustrating interconnected components of the foam production unit.

Referring now to FIG. 5, various components of a preferred embodiment of an aerial firefighting system 100 are shown, illustrating functional connections between the components. Foam production unit 120 is fixed (or rigidly attached) to the bottom of aircraft 110, and has a water tank 132 and a foam tank 134 that provide water and foam concentrate, respectively, to foam proportioning system 138, which, in preferred embodiments, mixes one hundred (100) gallons of water into one (1) to five (5) gallons of foam concentrate.

Foam proportioning system 138 sends the mixed foam concentrate and water to nozzles 144. Meanwhile, high-CFM fan 140 pushes air, which is directed by air straightener 148 toward nozzles 144. As a result, air and foam solution are pushed through a meshed screen grating 146 of one-eighth inch (⅛") holes into tubing 124 of foam tubing straightener 122. At this point, the air from the high-CFM fan 140 has caused an increase in the volume of the foam, producing approximately fifty thousand (50,000) cubic feet of foam for each gallon of foam concentrate and corresponding one hundred (100) gallons of water. The resulting production of foam is in excess of fifty-thousand (50,000) cubic feet per minute, which is discharged through foam tubing straightener 122 for fire suppression. The rate of foam produced is adjustable by the fire control pilot through a control unit 300 (shown in FIG. 9) for telemetry unit 142 when a lower volume per minute of foam is desirable; the ratio of water to foam concentrate is also adjustable by the fire control pilot through the control unit 300 for telemetry unit 142. Telemetry unit 142 directs the rate of foam production and ratio of water to foam concentrate through control signals to other components of aerial firefighting system 100, including water pump 143, fan 140, and water refill system 136.

Weighted ring 126 keeps tubing 124 in its extended configuration against wind currents, both naturally occurring and generated by aircraft 110. Cables 150 allow tubing 124 to be raised by power winches 152 into a retracted configuration during water refilling, and lowered into the extended configuration for foam delivery.

Water refill system 136 allows a tube or hose 156 to be extended in order to draw water into water tank 132 without requiring aircraft 110 to be on the ground. Thus, aerial firefighting system 100 is able to perform multiple suppression sequences before needing ground time. Preferred embodiments have a foam tank 134 with sufficient capacity that at least four suppression sequences can be performed before aircraft 110 is required to refill foam tank 134 with additional foam concentrate; moreover, the ground time needed for refilling foam concentrate is less than five minutes.

Figure 6:
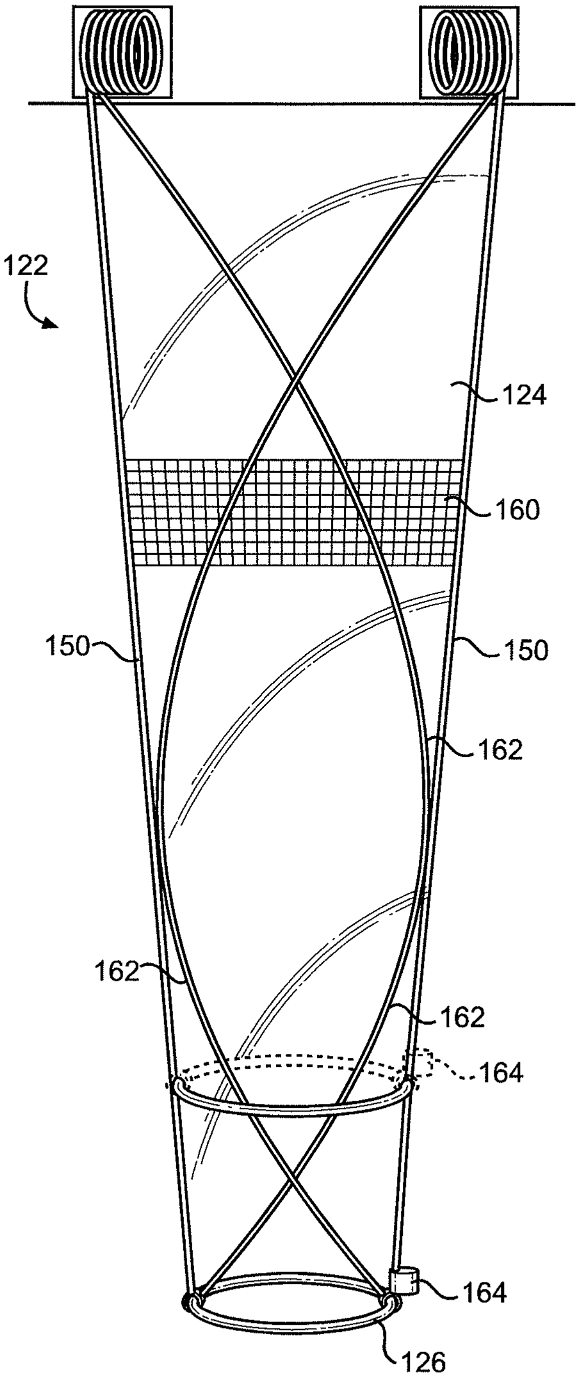
FIG. 6 is an explanatory diagram illustrating the parts of a preferred embodiment of a stream straightener of the aerial firefighting system.

Referring now to FIG. 6, foam tubing straightener 122, as attached to the base of foam production unit 120, is illustrated. The tubing 124 incorporates a honeycomb stream straightening system 160 within the tubing 124 and sewn-in flow vanes 162. A cable retracting/expansion control unit (CRCU) 164 restricts the flow of foam within the tubing 124 so that there is an increase in force of the foam as it exits the tubing 124 that increases the pressure at which the foam exits the tubing 124.

Figure 7:
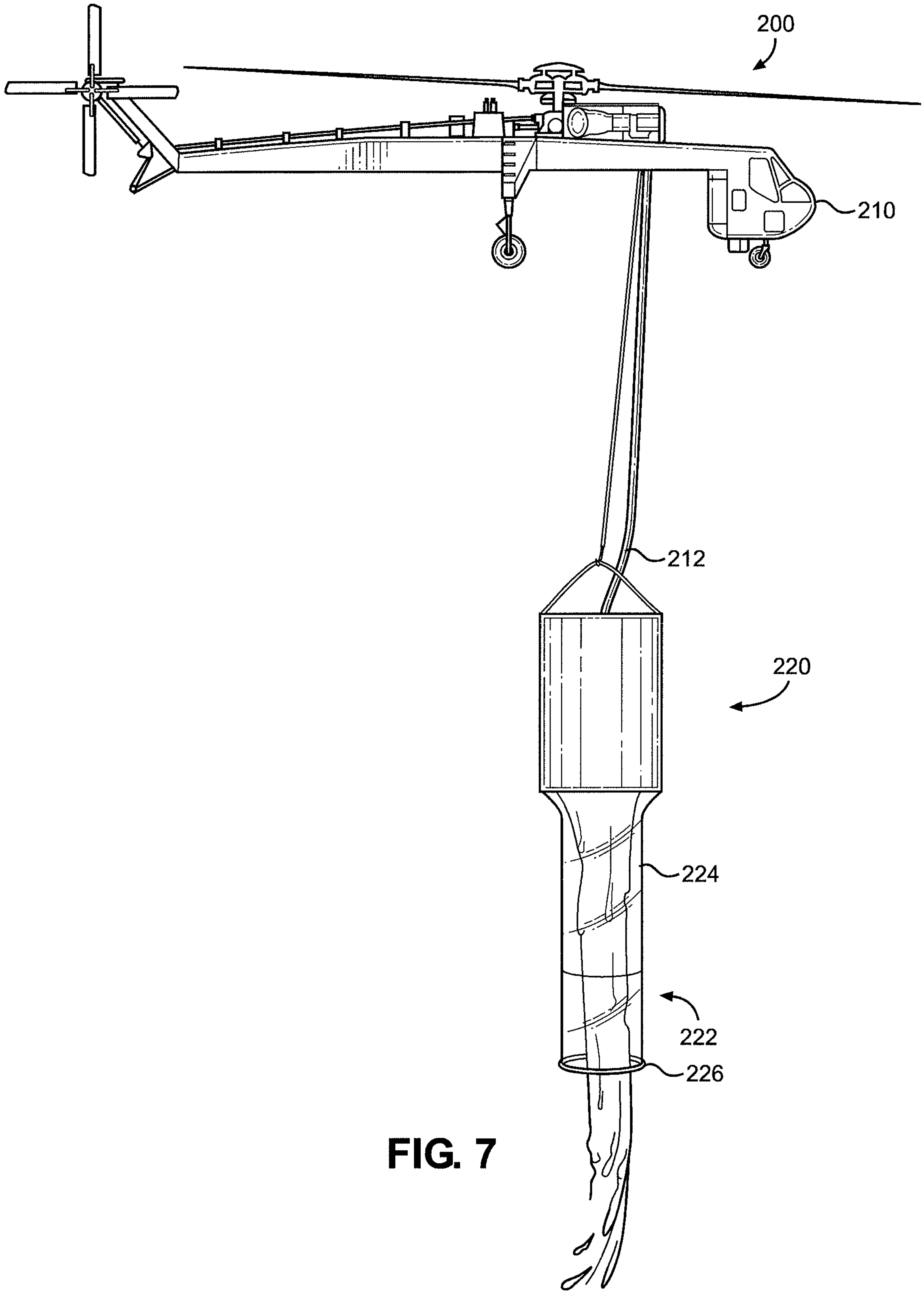
FIG. 7 is a side view of an alternate embodiment of a consolidated aerial high capacity foam firefighting system.

Referring now to FIG. 7, an alternative embodiment of an aerial firefighting system is illustrated and generally designated 200. Aerial firefighting system 200 includes an aircraft 210 and a cable system 212, including a load line 214 (shown in FIG. 8) and electric and water lines 216 (shown in FIG. 8), which suspends foam production unit 220 from the aircraft 210. Thus, foam production unit 220 is suspended from aircraft 210, as opposed to foam production unit 120 described in connection with FIGS. 1-6, which is fixed to the bottom of aircraft 110; in all other respects, embodiments of aerial firefighting unit 200 having the features and components of the various embodiments of aerial firefighting unit 100 are fully contemplated herein.

As with aerial firefighting unit 100, a preferred embodiment of aircraft 210 is a helicopter carrying foam production unit 220. From the base of foam production unit 220 of aerial firefighting system 200 is suspended a foam straightener 222 with a synthetic nylon tube 224 and a weighted ring 226 at the bottom of tube 224.

Figure 8:
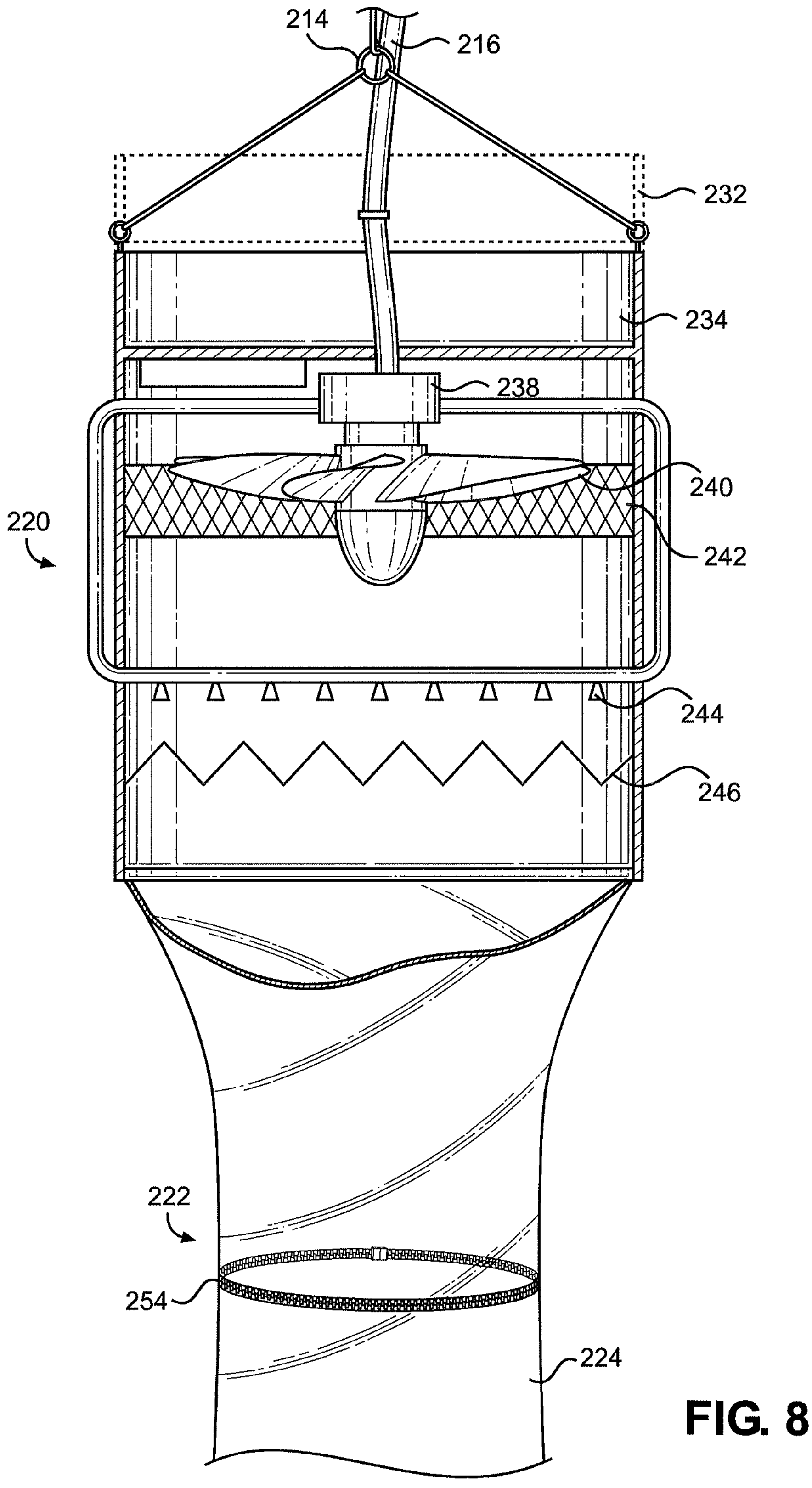
FIG. 8 is an explanatory diagram illustrating the components of a preferred embodiment of a foam production unit and stream straightener of the aerial firefighting system of FIG. 7.

Referring now to FIG. 8, the structure of a preferred embodiment of foam production unit 220 is illustrated. In some preferred embodiments, foam production unit 220 includes a water tank 232. In other preferred embodiments, water is supplied through a water line 216. Water from water tank 232 or water line 216 and foam concentrate from foam tank 234 is mixed by foam proportioning system 238. The resulting mixture is pushed by high-CFM fan 240, with air supplied through air vent 242, through nozzles 244 and a meshed screen grating 146 of one-eighth inch (⅛") holes, which results in the production and delivery through tubing 224 of foam straightener 222 of a large volume of foam, in preferred embodiments in excess of fifty-thousand (50,000) cubic feet of foam per minute.

One or more zippers 254 on the tubing 222 allow for removal of the tubing 222 when not in use and attachment of additional tubing up to a total length of one-hundred (100) feet.

Figure 9:
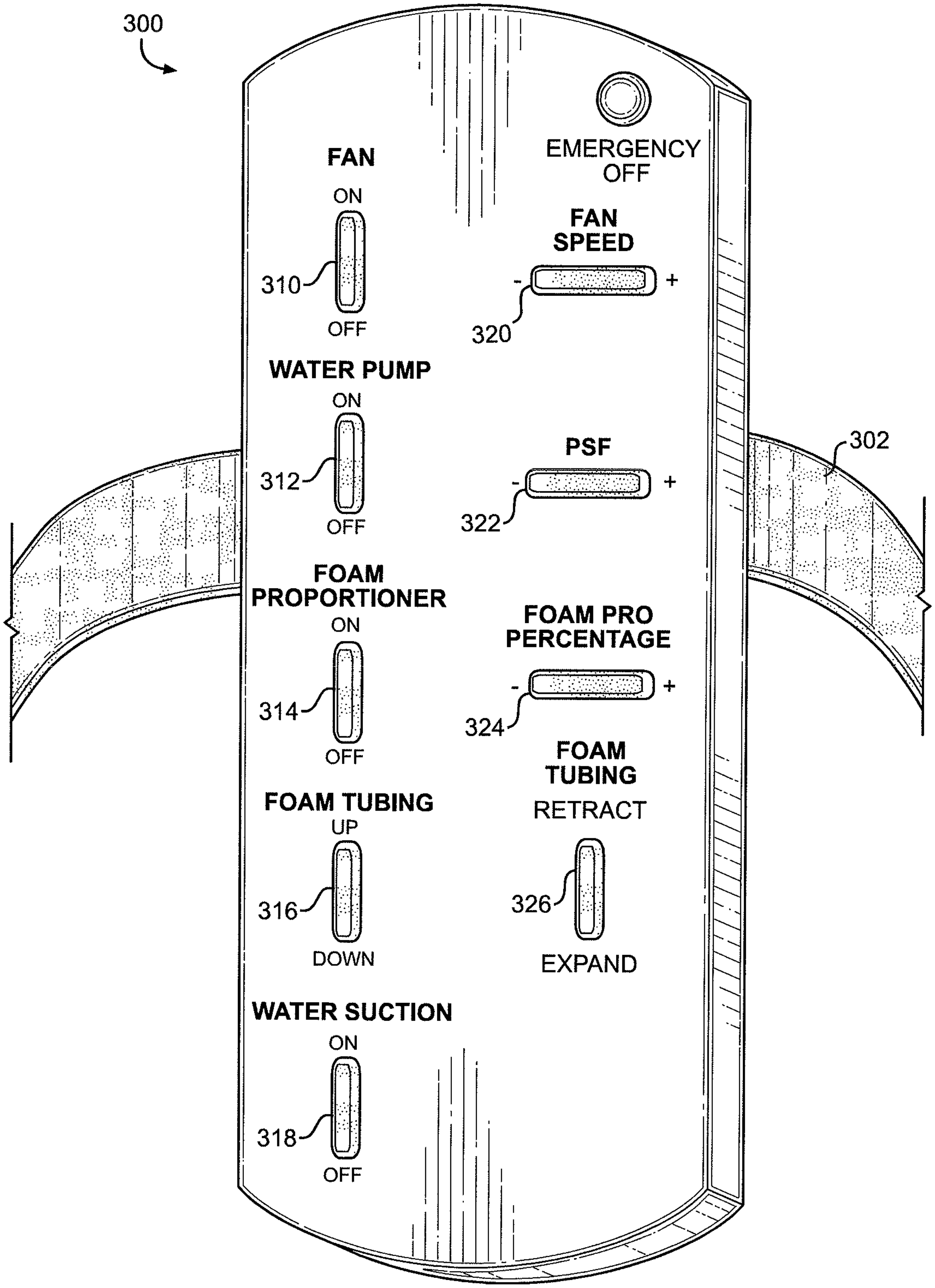
FIG. 9 is a front view of a preferred embodiment of a control unit for a telemetry unit of an aerial high capacity foam firefighting system.

Referring now to FIG. 9, a preferred embodiment of a control unit 300 for a telemetry unit 142 or telemetry units in other embodiments of aerial firefighting systems is illustrated. In a preferred embodiment, control unit 300 is based on an industrial wireless remote control such as those sold under the mark REMTRON T46 and has a leg strap 302. Control unit 300 has controls such as toggle switches and single-axis levers, or other controls known in the art, to control the operation of foam production unit 120. In preferred embodiments, controls include control 310 for turning fan 140 on and off, control 312 for turning the pump of water tank 132 on and off, control 314 for turning foam proportioning system 138 on and off, control 316 for putting up or down tubing 124, control 318 for turning on and off the water suction function of refill system 136, control 320 for adjusting the speed of fan 140, control 322 for adjusting water pressure of water delivered from water tank 132, control 324 for adjusting the amount of foam concentrate used by foam proportioning system 138, and control 326 for controlling the retraction and expansion of tubing 124.

Figure 10:
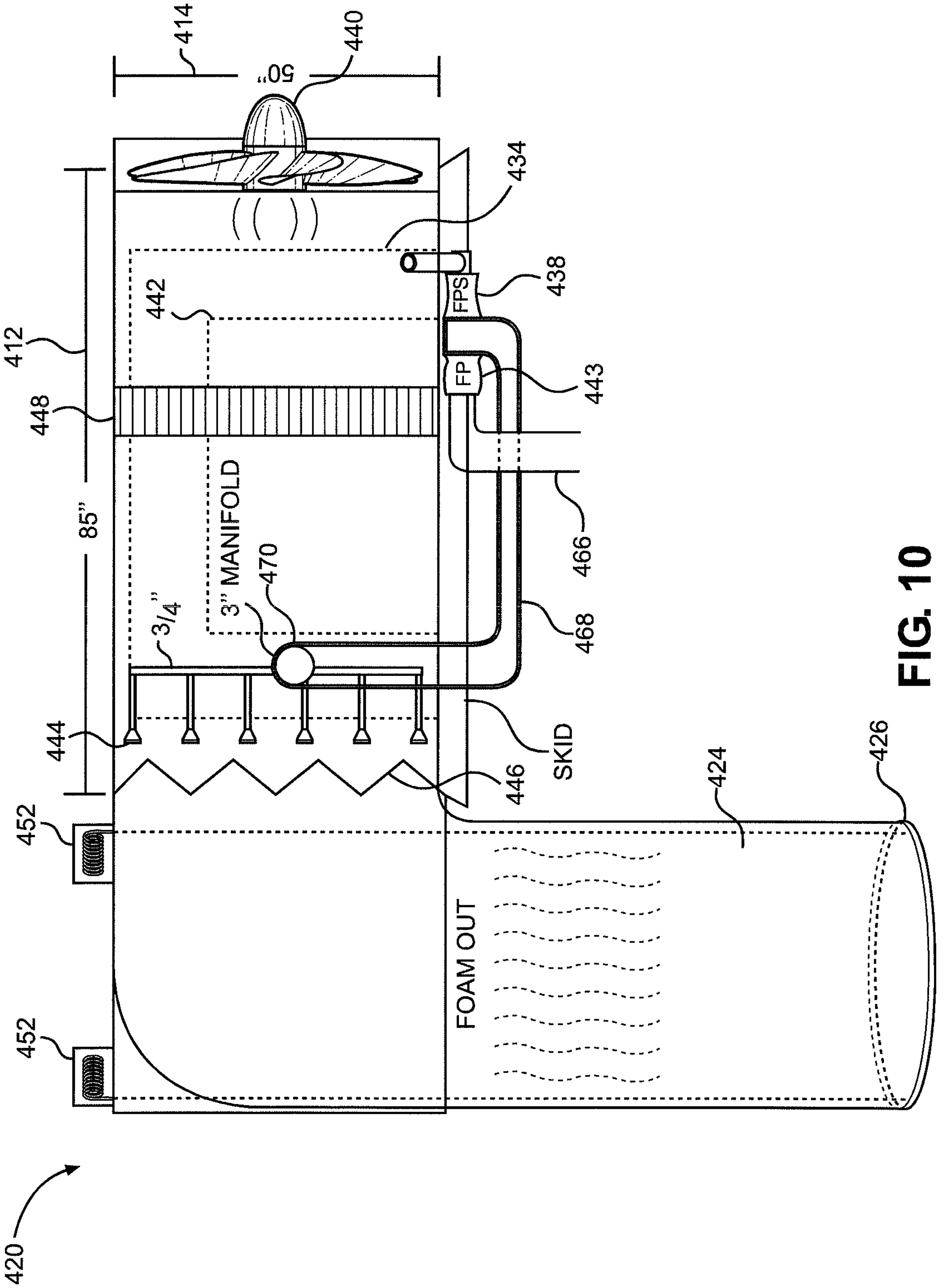
FIG. 10 is an explanatory diagram illustrating interconnected components of an alternative embodiment of a foam production unit for use with a Blackhawk helicopter.

Referring now to FIG. 10, a foam production unit 420 configured for installation in a Blackhawk helicopter 400 (shown in FIG. 12) is illustrated. Excluding synthetic nylon foam tubing 424, which extends outside helicopter 400 in order to deliver firefighting foam, foam production unit has a width 412 of approximately eighty-five (85) inches, a height 414 of approximately fifty (50) inches, and a length 416 (shown in FIG. 12) of approximately one-hundred fifty one (151) inches.

Foam production unit 420 has the same components and function as foam production unit 120 illustrated in FIGS. 4 and 5, arranged to fit in a Blackhawk helicopter 400. In order to illustrate the component layout of foam production unit 420, several major components are illustrated in FIGS. 10-13. Nonetheless, preferred embodiments of foam production unit 420 that include each of the possible combinations of features, components, and attributes described in conjunction with foam production unit 120 are fully contemplated.

Water tank 432 (shown in FIG. 11) and foam tank 434 provide water and foam concentrate, respectively, to foam proportioning system 438, which, in preferred embodiments, mixes one hundred (100) gallons of water into one (1) to five (5) gallons of foam concentrate, and sends the mixed foam concentrate and water through pipe 468 and manifold 470 to nozzles 444. The resultant foam is expanded with laminar air flow provided by air straightener 448 from air pushed by high-CFM fan 440, allowing for the production of more than fifty-thousand cubic feet of foam per minute. The high-CFM fan 440 also allows foam to be produced at a ratio of one-thousand to one (1,000:1), and as high as one-thousand-two-hundred to one (1,200:1), an increase of a factor of ten or more over existing firefighting systems that produce foam at a one-hundred to one (100:1) ratio.

The air and foam solution are pushed through a meshed screen grating 446 of one-eighth (⅛) inch holes into tubing 124. The rate of foam produced is adjustable by the fire control pilot through a control unit 300 (shown in FIG. 9) for telemetry unit 442. The ratio of water to foam concentrate is also adjustable by the fire control pilot through the control unit 300 for telemetry unit 442. Telemetry unit 442 directs the rate of foam production and ratio of water to foam concentrate through control signals to other components of foam production unit, including water pump 443, fan 440, and the water refill system present in preferred embodiments (see FIG. 5).

Weighted ring 426 keeps tubing 424 in its extended configuration against wind currents, both naturally occurring and generated by helicopter 400. Tubing 424 can be raised by power winches 452 into a retracted configuration during water refilling, and lowered into the extended configuration for foam delivery.

Figure 11:
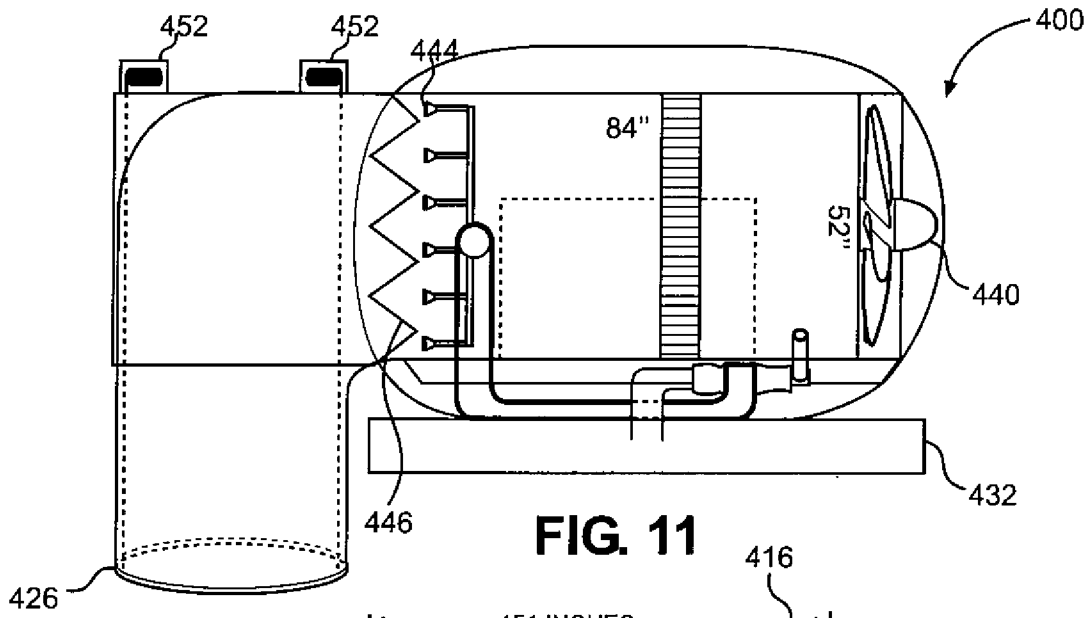
FIG. 11 illustrates the placement of the foam production unit in a Blackhawk helicopter from a perspective looking toward the front of the helicopter.

FIG. 11 a front view of how foam production unit 420 fits into helicopter 400 (represented by its roughly oval-shaped outline) is illustrated, with the tubing 424 portion outside helicopter 400 in order to deliver the fire suppressant foam. Water tank 432 is attached to the underside of helicopter 400 and provides water to foam proportioning system 438 through pipe 466 (see FIG. 10).

Figure 12:
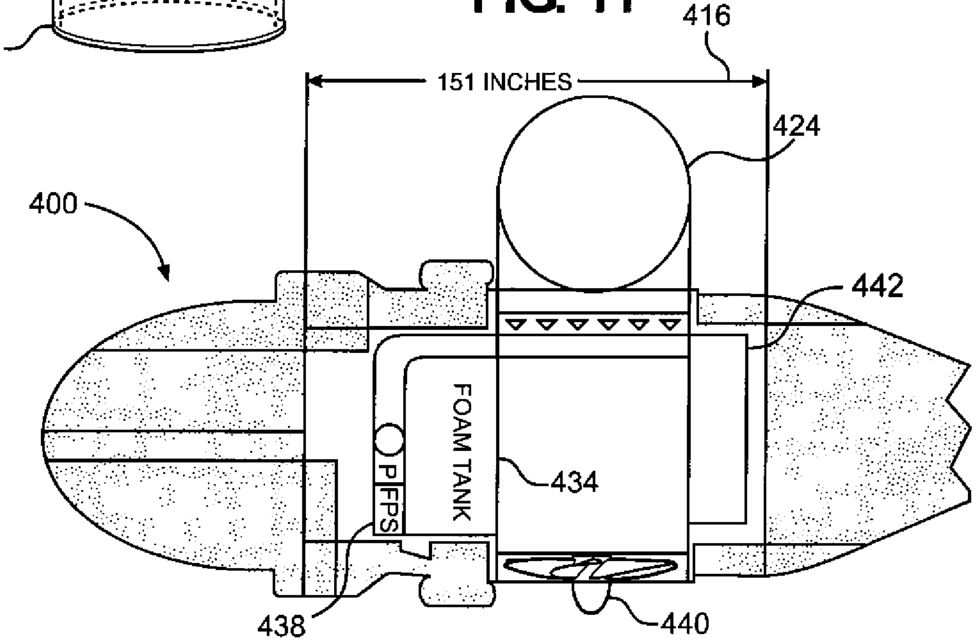
FIG. 12 illustrates the placement of the foam production unit in a Blackhawk helicopter from a perspective looking from above.

Referring now to FIG. 12, a top-down view of how foam production unit 420 fits into helicopter 400 is illustrated, showing length 416 of the foam production unit 420, the location of foam tank 434 and telemetry unit 442 on opposite ends of foam production unit 420, and nylon tubing 424 on the outside of the right side of helicopter 400.

Figure 13:
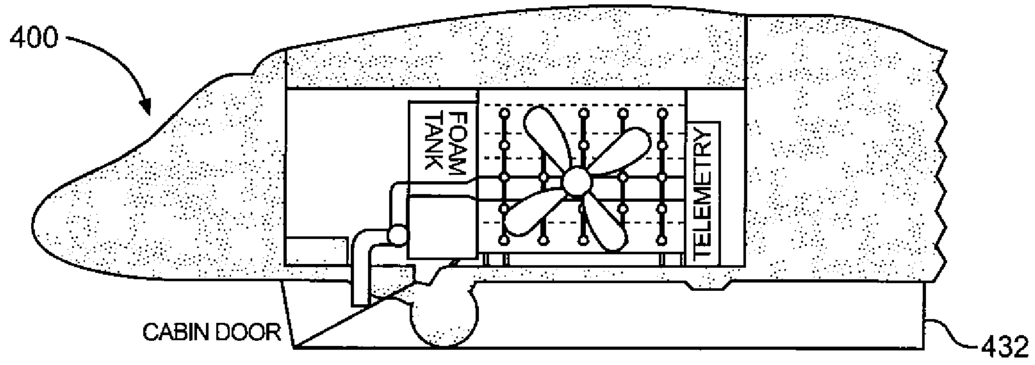
FIG. 13 illustrates the placement of the foam production unit in a Blackhawk helicopter from a perspective looking from the left side of the helicopter.

Referring now to FIG. 13 a left side view of how foam production unit 420 fits into helicopter 400 is illustrated, showing the location of high-CFM fan 440 on the left side of helicopter 400 and the location of foam tank 434 and telemetry unit 442 on opposite ends of foam production unit 420.

Figure 14:
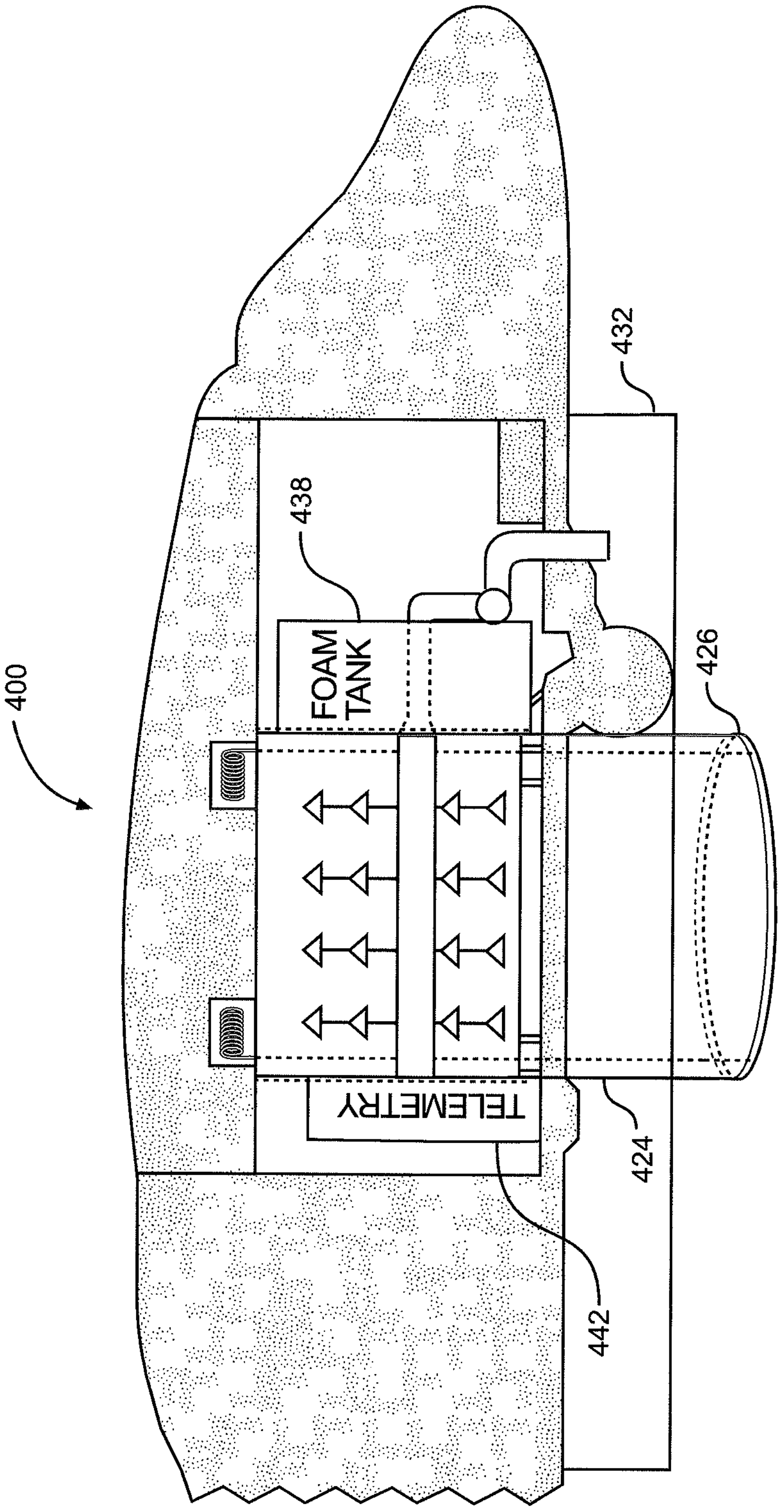
FIG. 14 illustrates the placement of the foam production unit in a Blackhawk helicopter from a perspective looking from the right side of the helicopter.

Referring now to FIG. 14, a right side view of how foam production unit 420 fits into helicopter 400 is illustrated, showing flexible synthetic nylon tube 424 suspending on the right side of helicopter 400, with weighted ring 426 at the bottom of tube 424 and power winches 452 to raise and lower tube 424.

While there have been shown what are presently considered to be preferred embodiments of the present invention, it will be apparent to those skilled in the art that various changes and modifications can be made herein without departing from the scope and spirit of the invention.

I claim:

1. A foam production unit configured to be carried by an aircraft, comprising:

a foam tubing straightener comprising:

tubing having an entrance and an exit; and one or more flow vanes coupled to the tubing along a diagonal path and extending along the tubing from the entrance to the exit;

a plurality of nozzles disposed upstream of and proximate to the entrance of the tubing;

a foam proportioning system coupled to the nozzles and configured to mix water and a foam-concentrate in a predetermined ratio and send the mixed water and foam concentrate through the nozzles; and an internal fan configured to provide an airflow of at least 75,000 CFM through the foam tubing straightener.

2. The foam production unit of claim 1, wherein:

the entrance of the tubing is coupled to the fan.

3. The foam production unit of claim 1, further comprising a cable retracting/expansion control unit (CRCU) coupled to the tubing and configured to selectively restrict the flow of foam within the tubing so that there is an increase in force of the foam as it exits the tubing.

4. The foam production unit of claim 3, wherein the CRCU is coupled to the tubing proximate to the exit.

5. The foam production unit of claim 1, wherein:

the entrance of the tubing is coupled to the fan; and the tubing comprises an extended configuration in which the exit is disposed vertically below the entrance.

6. The foam production unit of claim 5, further comprising:

a weighted ring coupled to the tubing proximate to the exit, thereby keeping the tubing in the extended configuration against wind currents while the aircraft is in flight.

7. The foam production unit of claim 1, wherein:

the foam production unit is configured to be suspended externally from the aircraft.

8. The foam production unit of claim 7, further comprising:

a cable system configured to be coupled between the foam production unit and the aircraft such that the foam production unit is disposed below and separate from the aircraft while the aircraft is in flight;

a water tank configured to store water aboard the aircraft; and a water line configured to be coupled between the water tank and the foam proportioning system while the foam production unit is suspended from the aircraft.

9. The foam production unit of claim 8, wherein the aircraft is a helicopter.

* * * * *